US010625746B2

(12) United States Patent
Nanri et al.

(10) Patent No.: US 10,625,746 B2
(45) Date of Patent: Apr. 21, 2020

(54) SELF-POSITION ESTIMATION METHOD AND SELF-POSITION ESTIMATION DEVICE

(71) Applicant: Nissan Motor Co., Ltd., Yokohama-shi, Kanagawa (JP)

(72) Inventors: Takuya Nanri, Kanagawa (JP); Chikao Tsuchiya, Kanagawa (JP); Yasuhito Sano, Kanagawa (JP); Hiroyuki Takano, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/320,191

(22) PCT Filed: Jul. 26, 2016

(86) PCT No.: PCT/JP2016/071921
§ 371 (c)(1),
(2) Date: Jan. 24, 2019

(87) PCT Pub. No.: WO2018/020588
PCT Pub. Date: Feb. 1, 2018

(65) Prior Publication Data
US 2019/0263420 A1 Aug. 29, 2019

(51) Int. Cl.
*G01C 21/00* (2006.01)
*B60W 40/10* (2012.01)
(Continued)

(52) U.S. Cl.
CPC ............ *B60W 40/10* (2013.01); *G01C 21/16* (2013.01); *G01C 21/30* (2013.01);
(Continued)

(58) Field of Classification Search
None
See application file for complete search history.

(56) References Cited

U.S. PATENT DOCUMENTS 9,587,948 B2 * 3/2017 Schuller ............... G01C 21/165
9,884,623 B2 * 2/2018 Fasola ................... B60W 40/10
(Continued)

FOREIGN PATENT DOCUMENTS

JP 2002163782 A 6/2002
JP 2007104171 A 4/2007
(Continued)

*Primary Examiner* — Jonathan M Dager
(74) *Attorney, Agent, or Firm* — Young Basile Hanlon & MacFarlane, P.C.

(57) ABSTRACT

A self-position estimation method includes: detecting a relative position of a target existing around a moving body relative to the moving body; estimating a movement amount of the moving body; correcting the relative position on a basis of the movement amount of the moving body and accumulating the corrected relative position as target position data; detecting a behavior change amount of the moving body; selecting, from among the accumulated target position data, the target position data of the relative position detected during a period in which the behavior change amount is less than a threshold value; and collating the selected target position data with map information indicating a position on a map of the target to estimate a present position of the moving body.

9 Claims, 10 Drawing Sheets

(51) Int. Cl.
*G01C 21/16* (2006.01)
*G01C 21/30* (2006.01)
*G01C 21/36* (2006.01)
*G01S 5/16* (2006.01)
*G05D 1/02* (2020.01)
*G01S 17/08* (2006.01)

(52) U.S. Cl.
CPC ............ *G01C 21/3602* (2013.01); *G01S 5/16* (2013.01); *G05D 1/0248* (2013.01); *B60W 2520/28* (2013.01); *G01S 17/08* (2013.01)

(56) References Cited

U.S. PATENT DOCUMENTS

| | | | | |
|---|---|---|---|---|
| 9,965,699 | B2* | 5/2018 | Sorstedt | B60R 1/00 |
| 10,061,324 | B2* | 8/2018 | Iimura | G01B 11/00 |
| 10,145,693 | B2* | 12/2018 | Asai | G01C 21/30 |
| 10,249,192 | B2* | 4/2019 | Wittorf | G08G 1/123 |
| 10,289,120 | B2* | 5/2019 | Ueda | G01C 21/165 |
| 10,338,601 | B2* | 7/2019 | Heimberger | B60W 40/04 |
| 2007/0075892 | A1* | 4/2007 | Horibe | G01S 17/023 342/70 |
| 2008/0319657 | A1* | 12/2008 | Gao | G01C 21/30 701/532 |
| 2009/0228204 | A1* | 9/2009 | Zavoli | G01C 21/30 701/532 |
| 2011/0190972 | A1* | 8/2011 | Timmons | G01C 21/34 701/31.4 |
| 2011/0205362 | A1 | 8/2011 | Suzuki | |
| 2012/0239239 | A1* | 9/2012 | Suyama | G05D 1/024 701/25 |
| 2013/0060443 | A1* | 3/2013 | Shida | B60K 31/0008 701/96 |
| 2013/0223686 | A1* | 8/2013 | Shimizu | G08G 1/166 382/103 |
| 2014/0297093 | A1* | 10/2014 | Murai | G01C 21/20 701/27 |
| 2015/0260530 | A1* | 9/2015 | Stenborg | G01C 21/28 701/461 |
| 2015/0332100 | A1* | 11/2015 | Yamaguchi | G06K 9/00798 348/142 |
| 2018/0045516 | A1* | 2/2018 | Sumizawa | G08G 1/0969 |
| 2018/0328742 | A1* | 11/2018 | Asai | G06F 16/29 |
| 2019/0033082 | A1* | 1/2019 | Asai | G01C 21/3602 |
| 2019/0265040 | A1* | 8/2019 | Takano | G06K 9/00791 |

FOREIGN PATENT DOCUMENTS

| | | |
|---|---|---|
| JP | 2008250906 A | 10/2008 |
| JP | 2011-215055 A | 10/2011 |
| JP | 2012103858 A | 5/2012 |

* cited by examiner

SELF-POSITION ESTIMATION METHOD AND SELF-POSITION ESTIMATION DEVICE

TECHNICAL FIELD

The present invention relates to a self-position estimation method and a self-position estimation device.

BACKGROUND

A technology described in Japanese Patent Application Publication No. 2008-250906 A is known as a technology for estimating the position of a moving body by detecting a relative position between a known target and the moving body.

A robot described in Japanese Patent Application Publication No. 2008-250906 A corrects an estimation result of a self-position of the robot on the basis of positional displacement information between a environment map indicating a movable region by point group data and ambient environment information indicating a detection result of a laser range sensor mounted in the robot by point group data.

In a moving body mounted with a sensor detecting a relative position between a target and the moving body, the orientation of the sensor changes depending on postural changes in response to behavior changes of the moving body, thereby causing an error in a detection result of the relative position.

It is an object of the present invention to, even when an error due to a behavior change of a moving body occurs in a relative position relative to a target detected by a sensor mounted in the moving body, suppress reduction in accuracy of position estimation for the moving body due to such an error.

SUMMARY

According to an aspect of the present invention, there is provided a self-position estimation method including: detecting a relative position of a target existing around a moving body relative to the moving body; correcting the relative position on a basis of a movement amount of the moving body and accumulating the corrected relative position as target position data. From among the accumulated target position data, the target position data of the relative position detected during a period in which a behavior change amount of the moving body is less than a threshold value is collated with map information to estimate a present position of the moving body.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Hereinafter, embodiments of the present invention will be described with reference to the drawings.

First Embodiment (Structure)

Figure 1:
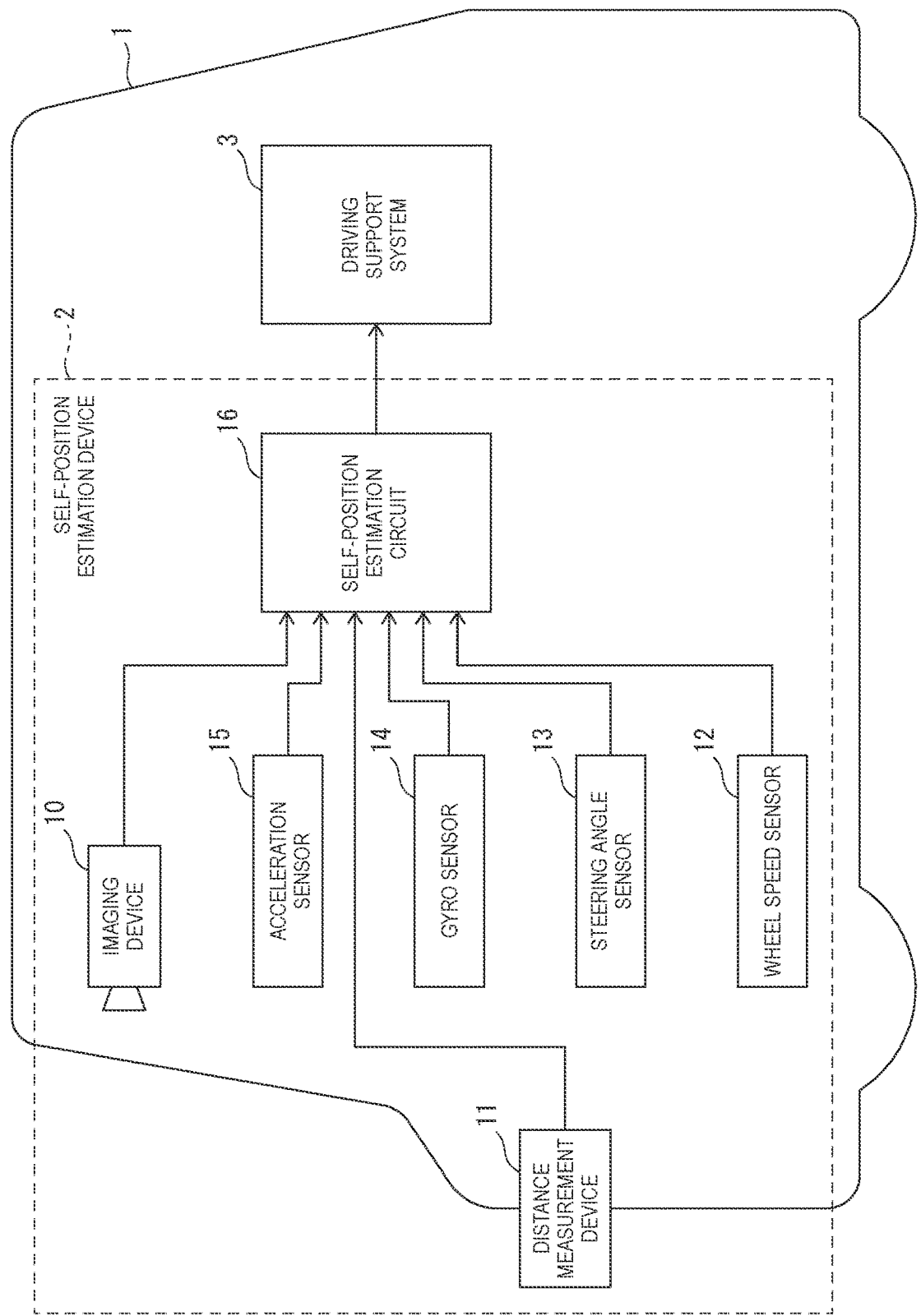
FIG. 1 is a block diagram of one example of the schematic structure of a vehicle mounted with a self-position estimation device of an embodiment.

Reference will be made to FIG. 1. While the following description will be given of estimation of a present position of a vehicle as one example of a moving body, the present invention is widely applicable to estimation of present positions of various moving bodies, including but not limited to vehicles.

A vehicle 1 is mounted with a self-position estimation device 2 and a driving support system 3. The self-position estimation device 2 includes an imaging device 10, a distance measurement device 11, a wheel speed sensor 12, a steering angle sensor 13, a gyro sensor 14, an acceleration sensor 15, and a self-position estimation circuit 16.

The imaging device 10 is mounted in an inside of a vehicle cabin or the like of the vehicle 1, and captures an image of, for example, a region ahead of the vehicle 1. The imaging device 10 may be, for example, a wide-angle camera. The imaging device 10 outputs the captured image of the region ahead of the vehicle 1 to the self-position estimation circuit 16.

The distance measurement device 11 is mounted to an outside of the vehicle cabin or the like of the vehicle 1, applies an electromagnetic wave to the region ahead of the vehicle 1, and detects a reflected wave therefrom. The distance measurement device 11 may be, for example, a laser range finder. In addition, a mounting position for the distance measurement device 11 may be, for example, around the bonnet, the bumper, the license plate, a headlight, or a side mirror of the vehicle 1. The distance measurement device 11 outputs a measurement result to the self-position estimation circuit 16.

The wheel speed sensor 12 generates a preset number of wheel speed pulses every time each wheel of the vehicle 1 rotates one time. The wheel speed sensor 12 outputs the wheel speed pulses to the self-position estimation circuit 16.

The steering angle sensor 13 is mounted, for example, onto a steering column configured to rotatably support a steering wheel of the vehicle 1. The steering angle sensor 13 detects a present steering angle that is a present rotation angle (a steering operation amount) of the steering wheel that is a steering operator. The steering angle sensor 13 outputs the detected present steering angle to the self-position estimation circuit 16.

The gyro sensor 14 detects a yaw rate, a displacement amount in a pitch direction, and a displacement amount in a roll direction, occurring in the vehicle 1. The gyro sensor 14 outputs the detected yaw rate, displacement amount in the pitch direction, and displacement amount in the roll direction to the self-position estimation circuit 16.

The acceleration sensor 15 detects a lateral G that is an acceleration/deceleration in a vehicle widthwise direction and an acceleration/deceleration in a front-rear direction occurring in the vehicle 1. The acceleration sensor 15 outputs the detected lateral G and the detected acceleration/deceleration in the front-rear direction to the self-position estimation circuit 16.

The self-position estimation circuit 16 is an electronic circuit device including a processor such as a central processing unit (CPU), a storage device, and peripheral components.

The self-position estimation circuit 16 estimates a present position of the vehicle 1 on a map on the basis of signals received from the imaging device 10, the distance measurement device 11, the wheel speed sensor 12, the steering angle sensor 13, the gyro sensor 14, and the acceleration sensor 15 and map information indicating a position of a known target on the map. Hereinafter, the present position of the vehicle 1 on the map may be referred to as "self-position". The self-position estimation circuit 16 outputs a self-position signal indicating the self-position to the driving support system 3.

The driving support system 3 performs driving support for driving of the vehicle 1 by a driver by using the self-position indicated by the self-position signal received from the self-position estimation circuit 16.

One example of the driving support may be, for example, provision of information such as an alarm to the driver. The driving support system 3 may control at least one of the type and strength of an alarm to be issued to the driver according to the self-position of the vehicle 1.

One example of the driving support may be control of a traveling state of the vehicle 1, including at least one of braking control, acceleration control, and steering control of the vehicle 1. For example, the driving support system 3 may determine whether to generate braking force or driving force in the vehicle 1 according to the self-position of the vehicle 1.

Figure 2:
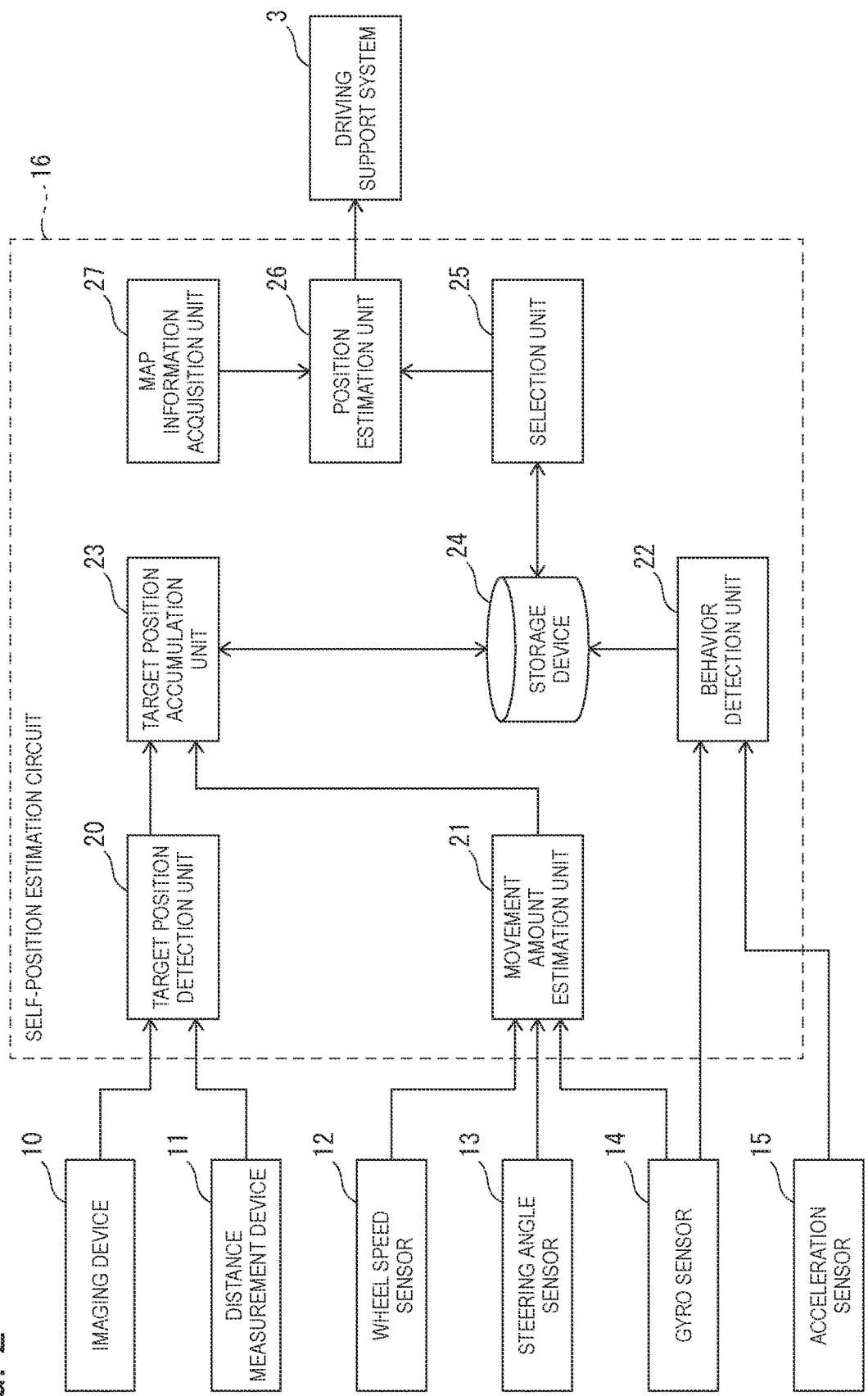
FIG. 2 is a block diagram of one example of the schematic structure of a self-position estimation circuit.

Next, the structure of the self-position estimation circuit 16 will be described. Reference will be made to FIG. 2. The self-position estimation circuit 16 includes a target position detection unit 20, a movement amount estimation unit 21, a behavior detection unit 22, a target position accumulation unit 23, a storage device 24, a selection unit 25, a position estimation unit 26, and a map information acquisition unit 27.

The processor included in the self-position estimation circuit 16 executes a computer program stored in the storage device 24 to achieve functions of the target position detection unit 20, the movement amount estimation unit 21, the behavior detection unit 22, the target position accumulation unit 23, the selection unit 25, the position estimation unit 26, and the map information acquisition unit 27.

The target position detection unit 20 receives the captured image of the region ahead of the vehicle 1 produced by the imaging device 10. Additionally, the target position detection unit 20 receives a measurement result of the distance measurement device 11.

The target position detection unit 20 detects a target existing around the vehicle 1 on the basis of the captured image of the region ahead of the vehicle 1 and the measurement result of the distance measurement device 11. For example, the target position detection unit 20 detects a target existing ahead of the vehicle 1.

In addition, the target position detection unit 20 detects a relative position of the target relative to the vehicle 1. The target position detection unit 20 outputs a relative position signal indicating the detected relative position to the target position accumulation unit 23.

Herein, the target may be, for example, a line (such as a lane marking) on a traveling road surface where the vehicle 1 is traveling, a curb of a road shoulder, a guardrail, or the like.

The movement amount estimation unit 21 receives the wheel speed pulses, the present steering angle, and the yaw rate, respectively, from the wheel speed sensor 12, the steering angle sensor 13, and the gyro sensor 14. On the basis of the signals received from the wheel speed sensor 12, the steering angle sensor 13, and the gyro sensor 14, the movement amount estimation unit 21 estimates a movement amount $\Delta P$ of the vehicle 1 up to the present from the time point when the self-position of the vehicle 1 is estimated in a previous processing cycle. The movement amount estimation unit 21 outputs a movement amount signal indicating the estimated movement amount $\Delta P$ to the target position accumulation unit 23.

The behavior detection unit 22 receives the yaw rate, the displacement amount in the pitch direction (i.e., a rotation amount in the pitch direction), and the displacement amount in the roll direction (i.e., a rotation amount in the roll direction), occurring in the vehicle 1, from the gyro sensor 14. The behavior detection unit 22 receives the lateral G and the acceleration/deceleration in the front-rear direction from the acceleration sensor 15.

On the basis of the signals received from the gyro sensor 14 and the acceleration sensor 15, the behavior detection unit 22 detects, as a behavior change amount of the vehicle 1, at least one of displacement amounts in the pitch direction and the roll direction from a reference static posture of the vehicle 1, the yaw rate, the lateral G, and the acceleration/deceleration in the front-rear direction. The behavior detection unit 22 may estimate the yaw rate or the lateral G on the basis of a steering control amount detected by the steering angle sensor 13.

The target position accumulation unit 23 receives the relative position signal from the target position detection unit 20, and receives the movement amount signal from the movement amount estimation unit 21.

The target position accumulation unit 23 accumulates the relative position of the target around the vehicle 1 indicated by the relative position signal in the storage device 24.

In addition, the target position accumulation unit 23 corrects a relative position of the target accumulated in the past to a relative position relative to the present position of the vehicle 1 by using an elapsed time up to the present and the movement amount $\Delta P$ indicated by the movement amount signal. In other words, the target position accumulation unit 23 moves the relative position in a direction opposite to the moving direction of the vehicle 1 by the movement amount $\Delta P$ in which the vehicle has moved during the elapsed time up to the present.

The target position accumulation unit 23 accumulates data of a target position (which may be hereinafter referred to as "target position data") that is the corrected relative position in the storage device 24. In this case, the behavior detection unit 22 adds a behavior change amount detected at the time of detection of the relative position of the target position data to the target position data, and stores in the storage device 24.

When the target position data is already accumulated in the storage device 24, the target position accumulation unit 23 updates the accumulated target position data by using the movement amount ΔP indicated by the movement amount signal. In other words, the target position accumulation unit 23 moves the relative position of the accumulated target position data in a direction opposite to the moving direction of the vehicle 1 by the movement amount ΔP. After that, the target position accumulation unit 23 overwrites the relative position relatively moved by the movement amount ΔP on the accumulated target position data.

The selection unit 25 selects target position data to be used for estimation of the self-position of the vehicle 1 from among the target position data accumulated in the storage device 24. The target position data to be selected for use in estimation of the self-position may be hereinafter referred to as "selected target position data".

The selection unit 25 may select target position data of, for example, a target around the present position of the vehicle 1. For example, the selection unit 25 may select the target position data of a target existing within about 20 m from the present position of the vehicle 1. The target position data of a target around the present position of the vehicle 1 tend to have high positional accuracy, because there is little accumulation of errors due to correction using the movement amount ΔP. For example, the positional data of a lane or a curb that is a road boundary is highly accurate in terms of a lateral position within a traveling road.

Additionally, when the behavior change amount of the vehicle 1 is large, orientations of the imaging device 10 and the distance measurement device 11 that serve as a target detection sensor configured to detect the relative position of a target change due to a postural change of the vehicle 1, thereby causing an error in the relative position of the target detected by the sensor.

Figure 3:
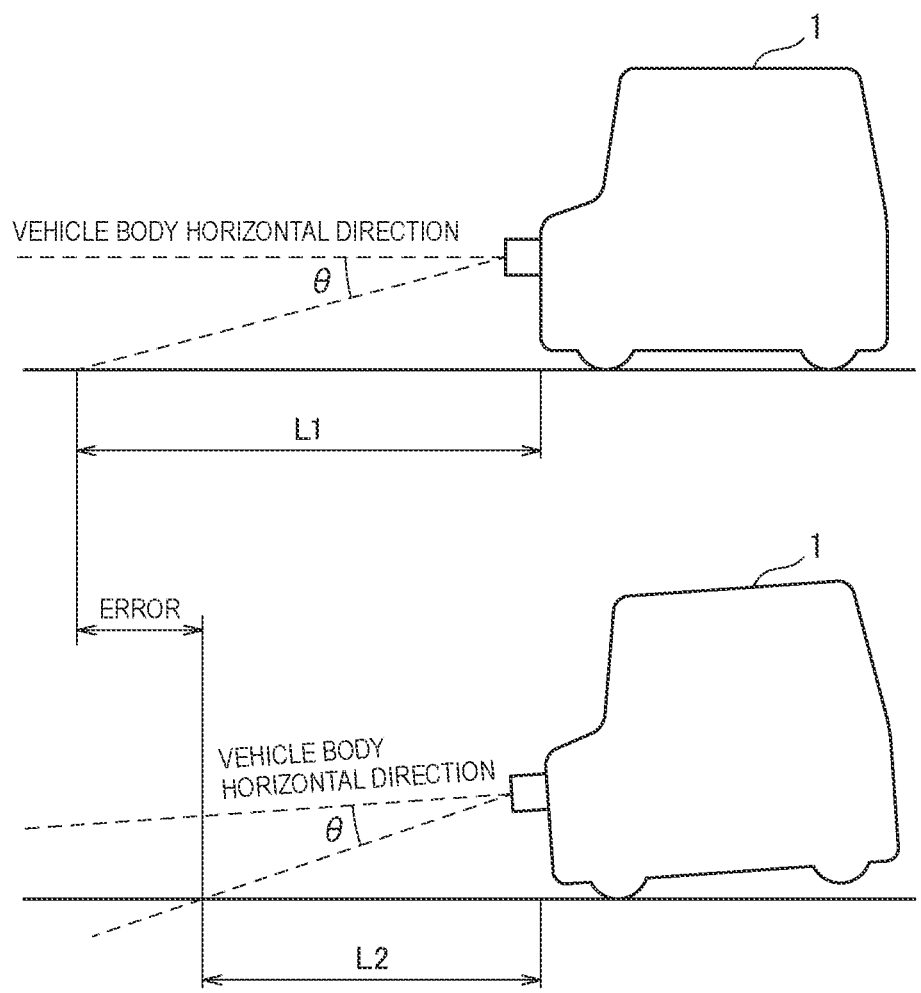
FIG. 3 is an illustrative diagram of a measurement error on a relative position of a target caused by the pitch of a vehicle.

Reference will be made to FIG. 3. The upper stage indicates a state where the posture of the vehicle 1 is a predetermined reference static posture. For example, the reference static posture may be a posture where a vehicle body horizontal direction of the vehicle 1 is parallel with a road surface. The lower stage indicates a state where the vehicle 1 is rotating in a pitch direction from the reference static posture.

When the vehicle 1 is in the reference static posture, a target ahead of the vehicle 1, which is away from the vehicle 1 by a distance L1, is detected in a downward direction by an angle θ from the vehicle body horizontal direction.

When the vehicle 1 is rotating in the pitch direction (i.e., when the vehicle 1 is being displaced in the pitch direction), a target away from the vehicle 1 by a distance L2 is detected in the downward direction by the same angle θ from the vehicle body horizontal direction. In other words, rotation of the vehicle 1 in the pitch direction causes the relative distance between the vehicle 1 and the target located away from the vehicle 1 by the distance L2 to be erroneously detected as the distance L1. This causes a measurement error (L1−L2).

Regarding the displacement amount in the pitch direction, the displacement of the vehicle 1 in the pitch direction changes due to acceleration/deceleration or the like, which may change a detection position of a target such as a stop line. For example, when a posture change of about one degree occurs in the pitch direction due to deceleration by brake, a distance to the stop line ahead by a distance of 5 m is erroneously calculated to be shorter by about 30 cm. When the self-position is estimated on the basis of such target position data, the self-position is erroneously calculated to be closer to the stop line by 30 cm from an exact position, so that there is a risk that the vehicle 1 may be off a desired traveling route, for example, at the time of turning right or left at an intersection.

Thus, the selection unit 25 refers to the displacement amount in the pitch direction added to the target position data and stored as the behavior change amount in the storage device 24, and selects, as the selected target position data, target position data in which the displacement amount in the pitch direction is less than a predetermined threshold value. In other words, the selection unit 25 selects, as the selected target position data, the target position data of the relative position detected during a period in which the displacement amount in the pitch direction is less than the threshold value.

Note that the displacement in the pitch direction occurs when the vehicle 1 accelerates/decelerates. Accordingly, the selection unit 25 may select, as the selected target position data, target position data in which the acceleration/deceleration stored as the behavior change amount in the storage device 24 is less than the predetermined threshold value.

Figure 4:
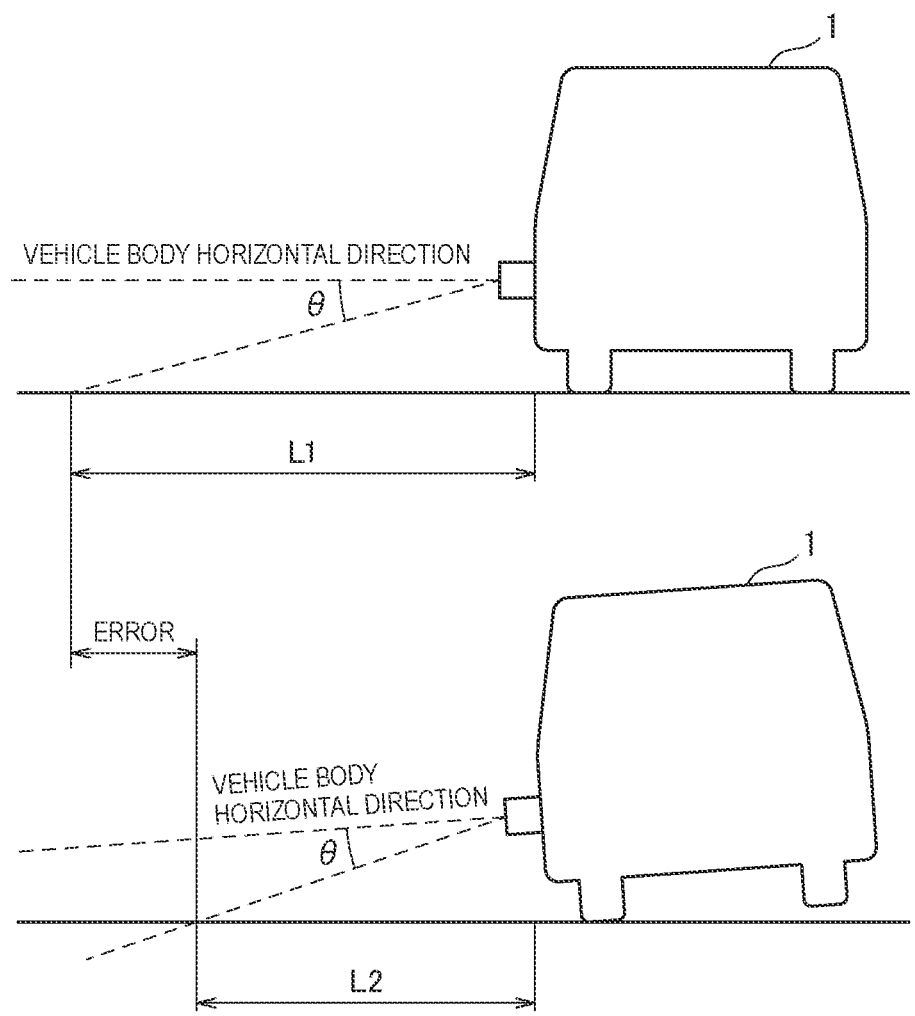
FIG. 4 is an illustrative diagram of a measurement error on a relative position of a target caused by the roll of a vehicle.

Reference will be made to FIG. 4. The upper stage indicates a state where the posture of the vehicle 1 is a predetermined reference static posture. The lower stage indicates a state where the vehicle 1 is rotating in the roll direction from the reference static posture.

When the vehicle 1 is in the reference static posture, a target on one side away from the vehicle 1 by the distance L1 is detected in a downward direction by an angle θ from the vehicle body horizontal direction.

When the vehicle 1 is rotating in the roll direction (i.e., when the vehicle 1 is being displaced in the roll direction), a target away from the vehicle 1 by the distance L2 is detected in a downward direction by the same angle θ from the vehicle body horizontal direction. In other words, rotation of the vehicle 1 in the roll direction causes a relative distance to the target away from the vehicle 1 by the distance L2 to be erroneously detected as the distance L1. This causes a measurement error (L1−L2).

Regarding the displacement amount in the roll direction, displacement in the roll direction changes due to the influence of cant or the like, so that the position of a target such as a white line or a curb existing on one side of the vehicle 1 may be erroneously calculated. For example, when a posture change of about one degree occurs in the roll direction on a road with a cant of about 2%, a distance to the white line on the one side away by a distance of 5 m is erroneously calculated to be shorter by about 30 cm. When the self-position is estimated on the basis of such target position data, the self-position is erroneously calculated to be displaced laterally by 30 cm, so that the vehicle 1 may run onto the curb or the like.

Due to this, the selection unit 25 refers to the displacement amount in the roll direction added to the target position data and stored as a behavior change amount in the storage device 24, and selects, as the selected target position data, target position data in which the displacement amount in the roll direction is less than the predetermined threshold value. In other words, the selection unit 25 selects, as the selected target position data, the target position data of the relative position detected during a period in which the displacement amount in the roll direction is less than the predetermined threshold value.

Note that displacement in the roll direction occurs at the time of turning of the vehicle 1. Accordingly, the selection unit 25 may select, as the selected target position data, target position data in which the yaw rate or the lateral G stored as the behavior change amount in the storage device 24 is less than the predetermined threshold value.

In this manner, the selection unit 25 selects, as the selected target position data, the target position data of the relative position detected during the period in which the behavior change amount is less than the threshold value from among the target position data accumulated in the storage device 24.

By selecting target position data with a behavior change amount less than the predetermined threshold value, target position data with a small error due to a behavior change of the vehicle 1 are selected as the selected target position data for use in estimation of the self-position of the vehicle 1. In other words, by not selecting target position data with a behavior change amount equal to or more than the predetermined threshold value, target position data with a large error due to a behavior change of the vehicle 1 are excluded from the selected target position data for use in estimation of the self-position of the vehicle 1. Note that it is unnecessary to select, as the selected target position data, all pieces of the target position data of the relative position detected during the period in which the behavior change amount is less than the threshold value, and only target position data necessary to enable estimation of the self-position of the vehicle 1 by collating with map information acquired by the map information acquisition unit 27 may be selected.

Figure 5:
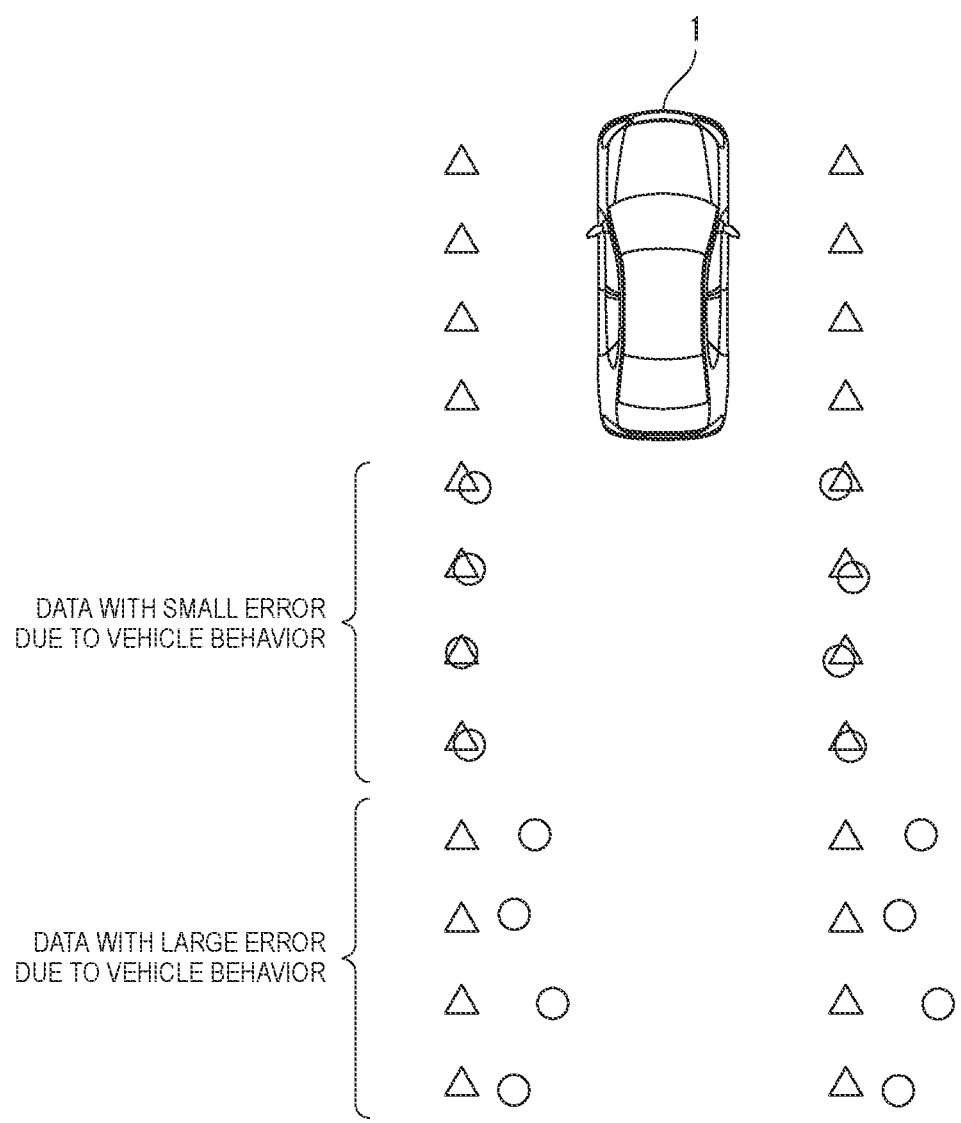
FIG. 5 is an illustrative diagram of selected target position data.

Reference will be made to FIG. 5. Circular plots schematically illustrate positions of the target indicated by target position data, and triangular plots schematically illustrate positions of the target on a map indicated by map information.

By selecting target position data with a behavior change amount less than the predetermined threshold value, target position data with a small error due to a behavior change of the vehicle 1 and favorably matching with the positions on the map can be selected, and data with a large error due to a behavioral change and hardly matching with the positions on the map can be excluded.

Reference will be made to FIG. 2. The position estimation unit 26 collates the selected target position data with the map information acquired by the map information acquisition unit 27 to estimate the self-position of the vehicle 1.

The map information acquisition unit 27 acquires map data and map information indicating a position on a map of a target existing on the map data. For example, the map information acquisition unit 27 is a car navigation system, a map database, or the like. Note that the map information acquisition unit 27 may acquire map information from outside via a communication system such as wireless communication (road-to-vehicle communication or vehicle-to-vehicle communication is also possible). In this case, the map information acquisition unit 27 may periodically acquire latest map information to update the possessed map information. Additionally, the map information acquisition unit 27 may accumulate, as map information, positional information of a target detected on a traveling road where the vehicle 1 has actually traveled.

The position estimation unit 26 may estimate the self-position of the vehicle 1 by collating the selected target position data with map information by, for example, data collation processing as below.

Figure 6:
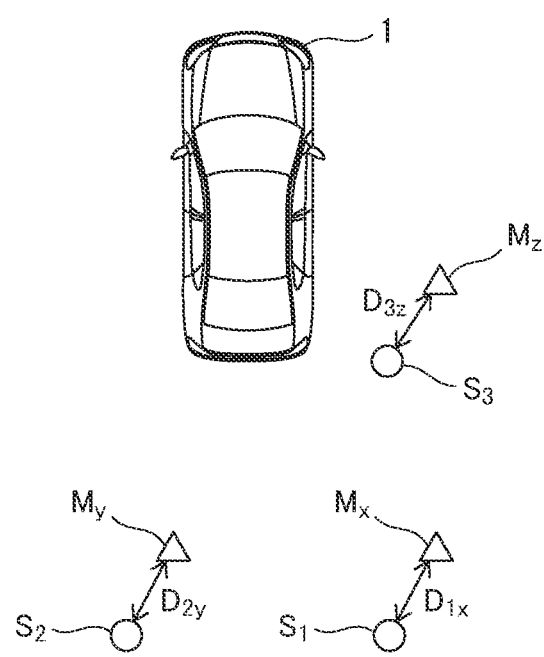
FIG. 6 is an illustrative diagram of one example of an estimation method for a self-position by collation of target position data with map information.

Reference will be made to FIG. 6. Reference sign $S_i$ denotes selected target position data. Index i is an integer of from 1 to N, and N is the number of pieces of selected target position data.

The position estimation unit 26 determines a tentative position of the vehicle 1 by correcting the self-position estimated in a previous processing cycle by the movement amount $\Delta P$.

The position estimation unit 26 assumes that the position on the map of the vehicle 1 is the tentative position, and converts the relative position of the target indicated by the selected target position data $S_i$ to an absolute position on the map. The position estimation unit 26 selects positional information $M_j$ of the target in the map information closest to the absolute position of the selected target position data $S_i$. In an example of FIG. 6, positional information $M_x$ is closest to selected target position data $S_1$, positional information $M_y$ is closest to selected target position data $S_2$, and positional information $M_z$ is closest to selected target position data $S_3$.

The position estimation unit 26 calculates a distance $D_{ij}$ between the selected target position data $S_i$ and the positional information $M_j$ closest to the data, and calculates an average S of the distance $D_{ij}$ by using the following formula (1):

$$S = \frac{1}{N}\sum_{i=1}^{N} D_{ij} \qquad (1)$$

The position estimation unit 26 calculates a position and a posture of the vehicle 1 having a minimum average S by numerical analysis, and determines them as estimation values of the self-position of the vehicle 1. The position estimation unit 26 outputs the estimation values of the self-position to the driving support system 3.

(Operation)

Figure 7:
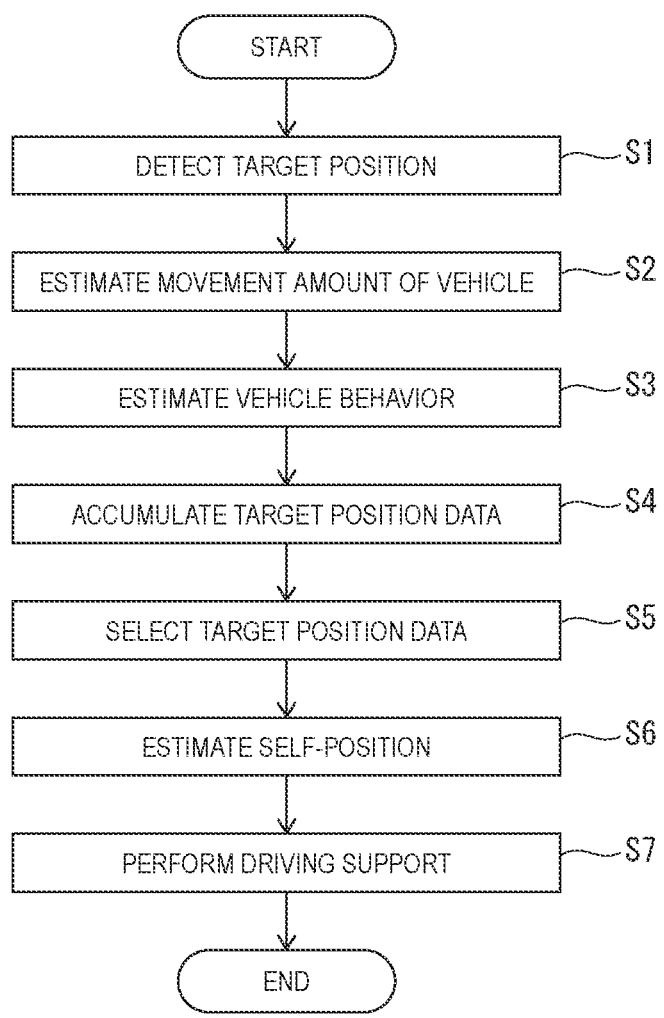
FIG. 7 is a flowchart illustrating one example of a self-position estimation method according to a first embodiment.

Next will be a description of operation of the self-position estimation device 2 according to the first embodiment. Reference will be made to FIG. 7.

At step S1, the imaging device 10, the distance measurement device 11, and the target position detection unit 20 detect the relative position of a target existing around the vehicle 1 relative to the vehicle 1. The target position detection unit 20 outputs a relative position signal indicating the detected relative position to the target position accumulation unit 23.

At step S2, the movement amount estimation unit 21 estimates the movement amount $\Delta P$ of the vehicle 1 up to the present from the time point when the self-position of the vehicle 1 is estimated in the previous processing cycle.

At step S3, the gyro sensor 14, the acceleration sensor 15, and the behavior detection unit 22 detect the behavior change amount of the vehicle 1.

At step S4, the target position accumulation unit 23 accumulates the relative position of the target around the vehicle 1 indicated by the relative position signal in the storage device 24. Additionally, the target position accumulation unit 23 corrects the relative position of the target accumulated in the past to a relative position relative to the present position of the vehicle 1 by using an elapsed time to the present and the movement amount $\Delta P$ indicated by the movement amount signal, and accumulates as target position data in the storage device 24. In this case, the behavior detection unit 22 adds the behavior change amount detected at the time of detection of the relative position of the target position data to the target position data, and stores in the storage device 24.

At step S5, the selection unit 25 selects, as the selected target position data, the target position data of the relative position detected during the period in which the behavior change amount is less than the threshold value from among the target position data accumulated in the storage device 24.

At step S6, the position estimation unit 26 collates the selected target position data with map information to estimate the self-position of the vehicle 1.

At step S7, the driving support system 3 uses the self-position of the vehicle 1 estimated by the position estimation unit 26 to perform driving support for driving of the vehicle 1 by a driver.

Effects of First Embodiment (1) The imaging device 10 and the distance measurement device 11 that serve as the target detection sensor and the target position detection unit 20 detect the relative position of a target existing around the vehicle 1 relative to the vehicle 1. The movement amount estimation unit 21 estimates the movement amount of the vehicle 1. The target position accumulation unit 23 corrects the relative position on the basis of the movement amount of the vehicle 1, and accumulates it as target position data. The gyro sensor 14 and the acceleration sensor 15 that serve as the behavior sensor and the behavior detection unit 22 detect the behavior change amount of the vehicle 1. The selection unit 25 selects the target position data of the relative position detected during the period in which the behavior change amount is less than the threshold value from among the accumulated target position data. The position estimation unit 26 collates the selected target position data with map information indicating the position on the map of the target to estimate the present position of the vehicle 1.

Since the target position data of the relative position detected during the period in which the behavior change amount is less than the threshold value is selected and used to estimate the position of the vehicle 1, target position data with a large error can be excluded from position estimation even when an error occurs in the target position data due to a postural change caused by a behavior change of a moving body. This can suppress reduction in accuracy of the position estimation for the vehicle 1 caused by an error occurring in the target position data due to the behavioral change of the moving body.

(2) The selection unit 25 selects target position data of a target around (in the vicinity of) the present position of the vehicle 1, and the position estimation unit 26 collates the selected target position data with map information. The target position data of the target around the present position of the vehicle 1 have little accumulation of errors due to correction using the movement amount ΔP, and therefore tend to have high positional accuracy. By selecting the target position data of a target around the present position of the vehicle 1 and using the data to estimate the position of the vehicle 1, accuracy in the position estimation for the vehicle 1 can be improved.

(3) The behavior change amount may include the rotation amount of the vehicle 1 in the pitch direction. In other words, the selection unit 25 may select, as target position data to be used for position estimation, target position data of the relative position detected during a period in which the rotation amount of the vehicle 1 in the pitch direction is less than the threshold value. This can suppress reduction in accuracy of the position estimation for the vehicle 1 caused by an error occurring in the target position data due to the rotation of the vehicle 1 in the pitch direction.

(4) The behavior change amount may include the rotation amount of the vehicle 1 in the roll direction. In other words, the selection unit 25 may select, as target position data to be used for position estimation, target position data of the relative position detected during a period in which the rotation amount of the vehicle 1 in the roll direction is less than the threshold value. This can suppress reduction in accuracy of the position estimation for the vehicle 1 caused by an error occurring in the target position data due to the rotation of the vehicle 1 in the roll direction.

(5) The behavior change amount may include the acceleration/deceleration of the vehicle 1. In other words, the selection unit 25 may select, as target position data to be used for position estimation, target position data of the relative position detected during a period in which the acceleration/deceleration of the vehicle 1 is less than the threshold value. The acceleration/deceleration of the vehicle 1 may be either an acceleration/deceleration in the front-rear direction or a lateral G.

The rotation of the vehicle 1 in the pitch direction occurs due to acceleration/deceleration in the front-rear direction, and the rotation thereof in the roll direction occurs due to acceleration/deceleration in the widthwise direction.

By using the target position data of the relative position detected during the period in which the acceleration/deceleration of the vehicle 1 is less than the threshold value, reduction in accuracy of the position estimation for the vehicle 1 can be suppressed that is caused by an error occurring in the target position data due to rotation in the pitch direction or the roll direction by the acceleration/deceleration.

(Modifications)

(1) The selection unit 25 may exclude the target position data of the relative position detected during a period in which the behavior change amount is equal to or more than the threshold value from the storage device 24. In other words, the selection unit 25 may select the target position data of the relative position detected during the period in which the behavior change amount is less than the threshold value, and may leave the data in the storage device 24. The position estimation unit 26 collates the target position data left in the storage device 24 with map information indicating a position on a map of the target to estimate the present position of the vehicle 1.

The storage region of the storage device 24 can be effectively utilized by deleting the target position data of the relative position detected during the period in which the behavior change amount is equal to or more than the threshold value from the storage device 24.

(2) When the behavior change of the vehicle 1 is a temporary change and does not affect the accuracy of estimation of the self-position, the selection unit 25 does not have to exclude even the target position data in the period with the behavior change amount being equal to or more than the threshold value from the selected target position data.

For example, when the period with the behavior change amount being equal to or more than the threshold value does not continue for a predetermined length of time or longer, the selection unit 25 selects, as the selected target position data, even the target position data of the relative position detected during the period with the behavior change amount being equal to or more than the threshold value, in addition to the period with the behavior change amount being less than the threshold value.

On the other hand, when the period with the behavior change amount being equal to or more than the threshold value continues for the predetermined length of time or longer, the selection unit 25 selects, as the selected target position data, the target position data of the relative position detected during the period with the behavior change amount being less than the threshold value (i.e., a period other than the period with the behavior change amount being equal to or more than the threshold value).

For example, when a behavior change amount equal to or more than the threshold value is continuously detected a predetermined number of times, the selection unit 25 may determine that the period with the behavior change amount being equal to or more than the threshold value continues for the predetermined length of time or longer.

In addition, when the behavior change amount equal to or more than the threshold value continues, and then the period with the behavior change amount being less than the threshold value does not continue for the predetermined length of time or longer, the selection unit 25 excludes, from the selected target position data, target position data of the relative position detected during the period in which the state with the behavior change amount being less than the threshold value does not continue for the predetermined length of time or longer.

For example, the selection unit 25 excludes, from the selected target position data, target position data of the relative position detected during a period from a time point of start of a period in which a behavior change amount equal to or more than the threshold value has been continuously detected the predetermined number of times to a time point of start of a period in which a behavior change amount less than the threshold value has been continuously detected the predetermined number of times.

In this manner, when the period with the behavior change amount being equal to or more than the threshold value continues for the predetermined length of time or longer, the selection unit 25 selects the target position data of the relative position detected during the period other than that period, so that the target position data of the period in which a behavior change affecting accuracy of the estimation of the self-position has occurred can be appropriately excluded.

Second Embodiment

Next will be a description of a self-position estimation device 2 according to a second embodiment.

When the vehicle 1 repeats acceleration/deceleration at low speed due to congestion or the like or when the vehicle 1 turns at an intersection or the like, accuracy of the wheel speed pulses is deteriorated, thereby reducing the measurement accuracy of the movement amount $\Delta P$ of the vehicle 1 in a traveling direction. When such a movement amount $\Delta P$ is used to correct the target position data accumulated in the storage device 24, errors are accumulated in the target position data. The same also applies to when a large yaw rate or lateral G occurs in the vehicle 1.

Due to this, when a behavior change amount equal to or more than the threshold value occurs, the selection unit 25 excludes target position data of the relative position detected before that from the selected target position data, and selects, as the selected target position data, the target position data of the relative position detected after the behavior change amount has become less than the threshold value. In other words, the selection unit 25 selects, as the selected target position data, the target position data of the relative position detected during a period in which the state with the behavior change amount being less than the threshold value continues until the present. Note that it is unnecessary to select, as the selected target position data, all pieces of the target position data of the relative position detected during the period in which the state with the behavior change amount being less than the threshold value continues until the present. Only target position data necessary to enable the self-position of the vehicle 1 to be estimated by collating with map information acquired by the map information acquisition unit 27 may be selected.

Figure 8:
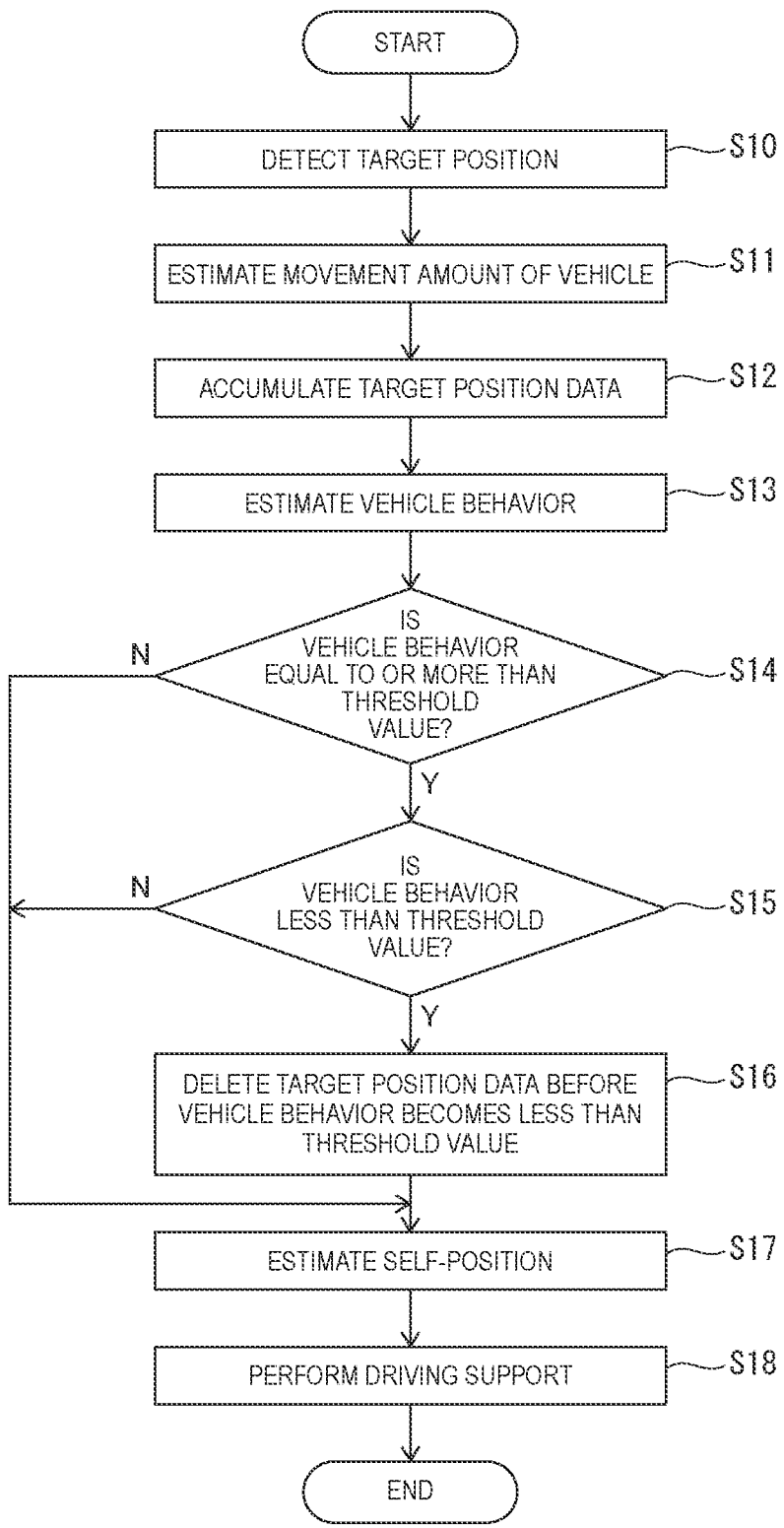
FIG. 8 is a flowchart illustrating one example of a self-position estimation method according to a second embodiment.

Reference will be made to FIG. 8.

Pieces of processing of steps S10 and S11 are the same as those of steps S1 and S2 of FIG. 7.

At step S12, the target position accumulation unit 23 accumulates the relative position of a target around the vehicle 1 indicated by the relative position signal in the storage device 24. Additionally, the target position accumulation unit 23 corrects the relative position of the target accumulated in the past to a relative position relative to the present position of the vehicle 1 by using an elapsed time to the present and the movement amount $\Delta P$ indicated by the movement amount signal, and accumulates it as target position data in the storage device 24.

Processing of step S13 is the same as the processing of step S3 of FIG. 7.

At step S14, the selection unit 25 determines whether or not the behavior change amount is equal to or more than the threshold value. When the behavior change amount is equal to or more than the threshold value (step S14: Y), the processing goes to step S15. When the behavior change amount is not equal to or more than the threshold value (step S14: N), the processing goes to step S17.

At step S15, the selection unit 25 determines whether or not the behavior change amount is less than the threshold value. When the behavior change amount is less than the threshold value (step S15: Y), the processing goes to step S16. When the behavior change amount is not less than the threshold value (step S15: N), the processing goes to step S17.

At step S16, the selection unit 25 deletes, from the storage device 24, target position data of the relative position detected before the behavior change amount has become less than the threshold value. In other words, the selection unit 25 selects the target position data of the relative position detected during the period in which the state with the behavior change amount being less than the threshold value continues until the present, and leaves it in the storage device 24.

At step S17, the position estimation unit 26 collates the target position data left in the storage device 24 with map information to estimate the present position of the vehicle 1.

Processing of step S18 is the same as the processing of step S7 of FIG. 7.

Effects of Second Embodiment (1) The selection unit 25 selects, as the selected target position data, the target position data of the relative position detected during the period in which the state with the behavior change amount being less than the threshold value continues to the present. The position estimation unit 26 collates the selected target position data left in the storage device 24 with the map information indicating the position on the map of the target to estimate the present position of the vehicle 1. Thus, target position data with reduced accuracy due to correction by the movement amount ΔP including an error caused by a behavior change of the vehicle 1 can be excluded from the selected target position data. As a result, even when a measurement error of the movement amount ΔP occurs due to a behavior change, reduction in accuracy of the estimation of the self-position can be suppressed.

(2) The behavior change amount may include the acceleration/deceleration of the vehicle 1. In other words, the selection unit 25 may select, as the selected target position data, target position data of the relative position detected during a period in which a state with the acceleration/deceleration of the vehicle 1 being less than the threshold value continues until the present. The acceleration/deceleration of the vehicle 1 may be an acceleration/deceleration in the front-rear direction, a lateral G, or a yaw rate.

Thus, even when a measurement error of the movement amount ΔP occurs due to acceleration/deceleration occurring in the vehicle 1, reduction in accuracy of the estimation of the self-position can be suppressed.

Third Embodiment

Next will be a description of a self-position estimation device 2 according to a third embodiment.

By performing self-position estimation using the target position data of the relative position detected during a period in which the state with the behavior change amount being less than the threshold value continues, a measurement error occurring in the relative position relative to the target or the movement amount ΔP can be suppressed, enabling estimation of the self-position of the vehicle 1.

Accordingly, when the behavior change amount is equal to or more than the threshold value in a certain first period, the self-position of the vehicle 1 can be detected with high accuracy during each of a second period before the first period, in which the behavior change amount is less than the threshold value and a third period after the first period, in which the behavior change amount becomes less than the threshold value. Thus, a relative position between the self-position of the vehicle 1 estimated during the second period and the self-position of the vehicle 1 estimated during the third period can be calculated with high accuracy.

Accordingly, even when the target position data of the relative position detected during the second period is corrected by the movement amount ΔP including an error during the first period with a behavior change amount equal to or more than the threshold value, and thereby accuracy is reduced, correction can be made using the relative position between the self-position estimated during the second period and the self-position estimated during the third period.

The self-position estimation circuit 16 of the third embodiment corrects the target position data of the relative position detected during the second period by using the relative position between the self-position estimated during the second period and the self-position estimated during the third period.

Figure 9:
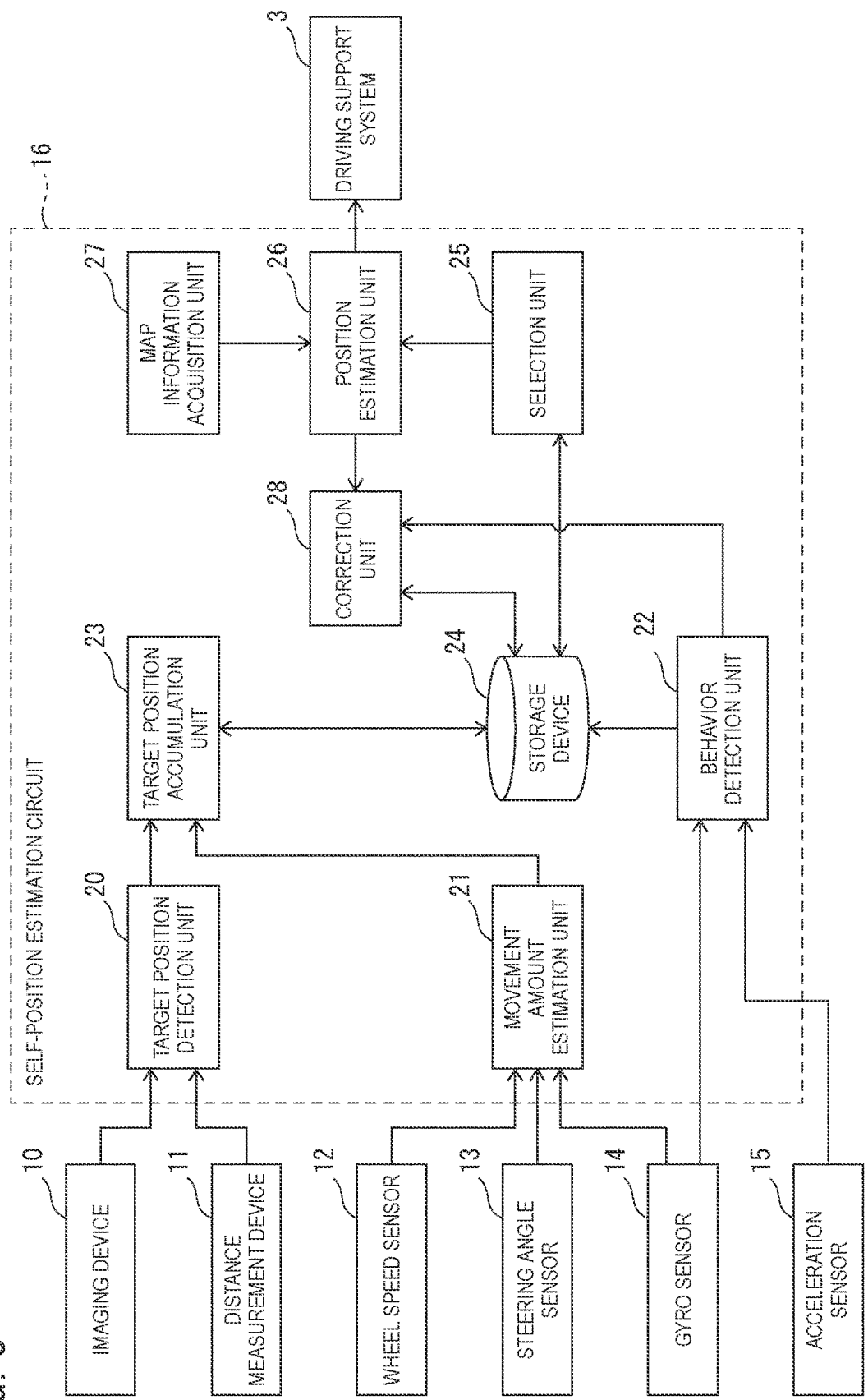
FIG. 9 is a block diagram of one example of the schematic structure of a self-position estimation circuit according to a third embodiment.

Reference will be made to FIG. 9. The self-position estimation circuit 16 includes a correction unit 28. The processor included in the self-position estimation circuit 16 executes a computer program stored in the storage device 24 to achieve function of the correction unit 28.

In the second period with the behavior change amount being less than the threshold value before the first period, the position estimation unit 26 collates the target position data of the relative position detected during the second period with map information to estimate a first position of the vehicle 1 before the first period. The position estimation unit 26 outputs the first position to the driving support system 3 and the correction unit 28.

The correction unit 28 adds information of the first position of the vehicle 1 estimated in the second period to the target position data of the relative position detected during the second period, and stores in the storage device 24.

In the third period with the behavior change amount being less than the threshold value after the first period, the position estimation unit 26 collates the target position data of the relative position detected during the third period with map information to estimate a second position of the vehicle 1 after the first period. The position estimation unit 26 outputs the second position to the correction unit 28.

The correction unit 28 corrects the target position data of the relative position detected during the second period, on the basis of a relative position between the first position and the second position.

After the target position data of the relative position detected during the second period has been corrected, the position estimation unit 26 collates the corrected target position data and the target position data of the relative position detected during the third period with map information to estimate the second position of the vehicle 1 after the first period. Note that regarding the corrected target position data and the target position data of the relative position detected during the third period, it is unnecessary to collate all pieces of the target position data with map information, and only target position data necessary to enable estimation of the self-position of the vehicle 1 may be collated with map information.

The position estimation unit 26 outputs the second position estimated after the correction of the target position data to the driving support system 3. The position estimation unit 26 adds information of the second position estimated after the correction of the target position data to the target position data of the relative position detected during the third period, and stores in the storage device 24.

Figure 10:
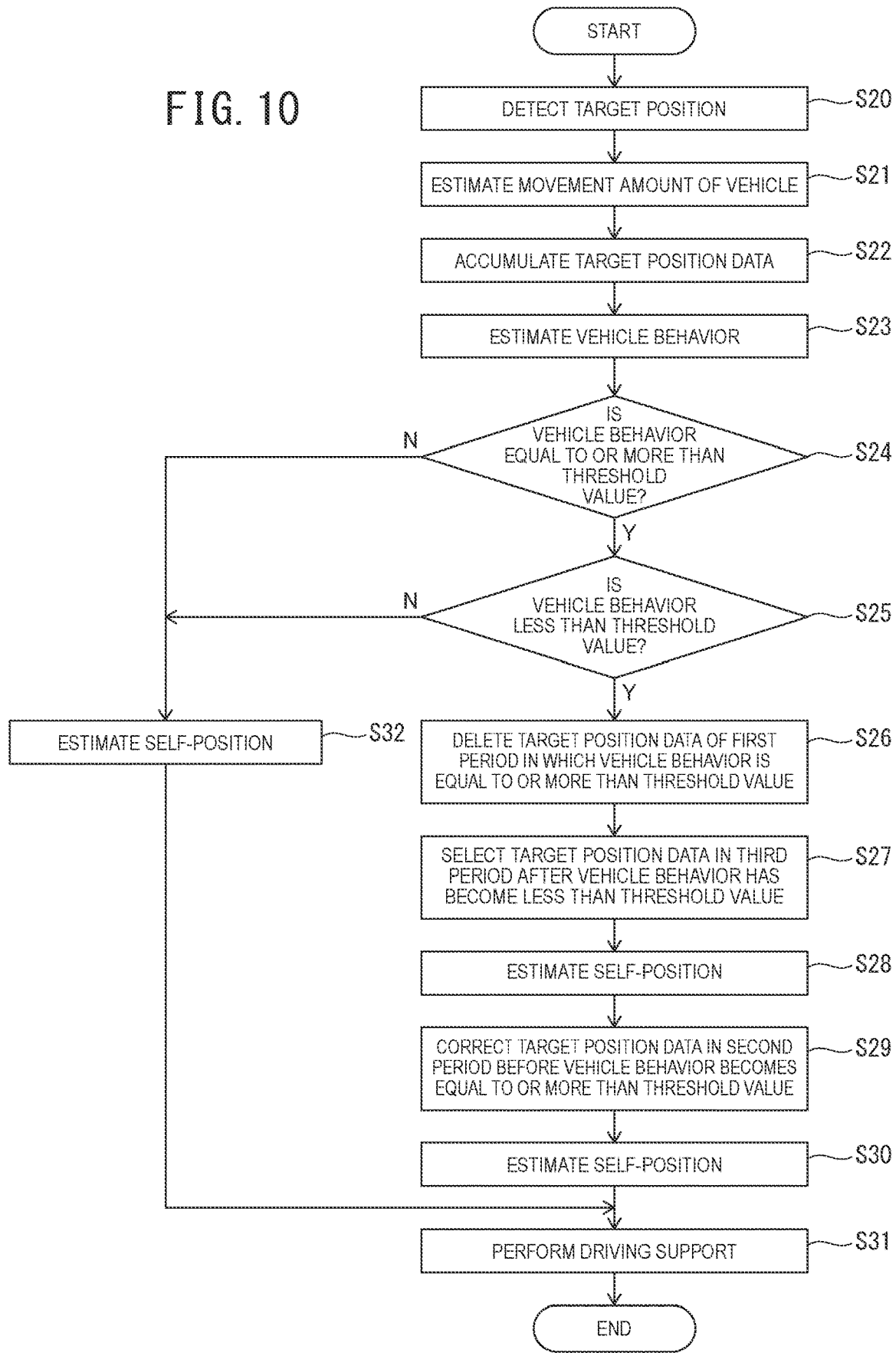
FIG. 10 a flowchart illustrating one example of a self-position estimation method according to the third embodiment.

Reference will be made to FIG. 10. Pieces of processing of steps S20 to S23 are the same as those of steps S10 to S13 of FIG. 8.

At step S24, the selection unit 25 determines whether or not the behavior change amount is equal to or more than the threshold value. When the behavior change amount is equal to or more than the threshold value (step S24: Y), the processing goes to step S25. When the behavior change amount is not equal to or more than the threshold value (step S24: N), the processing goes to step S32.

At step S25, the selection unit 25 determines whether or not the behavior change amount is less than the threshold value. When the behavior change amount is less than the threshold value (step S25: Y), the processing goes to step S26. When the behavior change amount is not less than the threshold value (step S25: N), the processing goes to step S32.

At step S26, the selection unit 25 deletes, from the storage device 24, the target position data of the relative position detected during the first period with the behavior change amount being equal to or more than the threshold value.

At step S27, the selection unit 25 selects the target position data of the relative position detected during the third period with the behavior change amount being less than the threshold value after the first period.

At step S28, the position estimation unit 26 collates the target position data selected at step S27 with map information to estimate the second position of the vehicle 1.

At step S29, the correction unit 28 reads out, from the storage device 24, the information of the first position of the vehicle 1 estimated in the second period, which was stored in addition to the target position data of the second period with the behavior change amount being less than the threshold value before the first period. The correction unit 28 corrects the target position data of the relative position detected during the second period, on the basis of the relative position between the first position and the second position.

At step S30, the position estimation unit 26 collates the target position data left in the storage device 24 (i.e., the target position data corrected at step S29 and the target position data of the relative position detected during the third period) with map information to estimate the second position after the first period. The correction unit 28 adds information of the second position of the vehicle 1 estimated at step S30 to the target position data of the relative position detected during the third period, and stores in the storage device 24.

Processing of step S31 is the same as the processing of step S18 of FIG. 8.

Processing of step S32 is the same as the processing of step S17 of FIG. 8. After step S32, the processing goes to step S31.

Effects of Third Embodiment

The position estimation unit 26 collates the target position data of the relative position detected during the second period in which the behavior change amount is less than the threshold value before the first period in which the behavior change amount is equal to or more than the threshold value with map information to estimate the first position of the vehicle 1 before the first period. Additionally, the position estimation unit 26 collates the target position data of the relative position detected during the third period in which the behavior change amount is less than the threshold value after the first period with map information to estimate the second position of the vehicle 1 after the first period. The correction unit 28 corrects the target position data of the relative position detected during the second period, on the basis of the relative position between the first position and the second position. The position estimation unit 26 collates the corrected target position data and the target position data of the relative position detected during the third period with map information to estimate the self-position of the vehicle 1.

In this manner, the target position data of the relative position detected before the first period with the behavior change amount being equal to or more than the threshold value can be used again, thus enabling improvement in accuracy of self-position estimation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Vehicle
2: Self-position estimation device
3: Driving support system
10: Imaging device
11: Distance measurement device
12: Wheel speed sensor
13: Steering angle sensor
14: Gyro sensor
15: Acceleration sensor
16: Self-position estimation circuit
20: Target position detection unit
21: Movement amount estimation unit
22: Behavior detection unit
23: Target position accumulation unit
24: Storage device
25: Selection unit
26: Position estimation unit
27: Map information acquisition unit
28: Correction unit

The invention claimed is:

1. A self-position estimation method comprising:
detecting, by a target detection sensor, a relative position of a target existing around a moving body relative to the moving body;
detecting, by a behavior sensor, a behavior change amount of the moving body;
estimating, by a self-position estimation circuit, a movement amount of the moving body;
correcting, by the self-position estimation circuit, the relative position on a basis of the movement amount of the moving body and accumulating the corrected relative position as target position data;
selecting, by the self-position estimation circuit and from among the accumulated target position data, the target position data of the relative position detected during a period in which the behavior change amount is less than a threshold value; and
collating, by the self-position estimation circuit, the selected target position data with map information indicating a position on a map of the target to estimate a present position of the moving body.

2. The self-position estimation method according to claim 1, wherein when a period in which the behavior change amount is equal to or more than the threshold value continues for a predetermined length of time or longer, the target position data of the relative position detected during a period other than the period in which the behavior change amount is equal to or more than the threshold value is selected and collated with the map information, and
when the period in which the behavior change amount is equal to or more than the threshold value does not continue for the predetermined length of time or longer, the target position data of the relative position detected during the period in which the behavior change amount is equal to or more than the threshold value is included in the target position data to be collated with the map information.

3. The self-position estimation method according to claim 1, wherein the target position data of the target around the present position of the moving body is selected and collated with the map information.

4. The self-position estimation method according to claim 1, wherein the behavior change amount includes a rotation amount of the moving body in a pitch direction.

5. The self-position estimation method according to claim 1, wherein the behavior change amount includes a rotation amount of the moving body in a roll direction.

6. The self-position estimation method according to claim 1, wherein the behavior change amount includes acceleration/deceleration of the moving body.

7. The self-position estimation method according to claim 1, wherein the target position data of the relative position detected during a period in which a state with the behavior change amount being less than the threshold value continues until the present is selected and collated with the map information.

8. The self-position estimation method according to claim 1, wherein the target position data of the relative position detected during a second period in which the behavior change amount is less than the threshold value before a first period in which the behavior change amount is equal to or more than the threshold value is collated with the map information to estimate a first position of the moving body before the first period; the target position data of the relative position detected during a third period in which the behavior change amount is less than the threshold value after the first period is collated with the map information to estimate a second position of the moving body after the first period; and on a basis of a relative position between the first position and the second position, the target position data of the relative position detected during the second period is corrected.

9. A self-position estimation device comprising:
a target detection sensor configured to detect a relative position of a target existing around a moving body relative to the moving body;
a wheel speed sensor configured to detect a wheel speed of the moving body;
a behavior sensor configured to detect a behavior change amount of the moving body; and
a self-position estimation circuit configured to estimate a movement amount of the moving body according to at least a detection result of the wheel speed sensor, correct the relative position detected by the target detection sensor on a basis of the movement amount and accumulate the corrected relative position as target position data in a storage device, select, from among the accumulated target position data, the target position data of the relative position detected during a period in which the behavior change amount is less than a threshold value, and collate the selected target position data with map information indicating a position on a map of the target to estimate a present position of the moving body.

\* \* \* \* \*